United States Patent [19]
Okuno et al.

[11] 3,961,359
[45] June 1, 1976

[54] VIDEO SIGNAL PROCESSING SYSTEM FOR REPRODUCING A VIDEO SIGNAL FROM A BANDWIDTH LIMITED RECORDED SIGNAL

[75] Inventors: Noboru Okuno, Sennan; Toshiro Kamogawa; Kosei Kamisaka, both of Hirakata, all of Japan

[73] Assignee: Matsushita Electric Industrial Co., Ltd., Osaka, Japan

[22] Filed: Feb. 20, 1974

[21] Appl. No.: 443,994

[30] Foreign Application Priority Data

| Feb. 20, 1973 | Japan | 48-20838 |
| Feb. 22, 1973 | Japan | 48-21462 |
| May 31, 1973 | Japan | 48-61539 |
| May 31, 1973 | Japan | 48-61540 |
| July 23, 1973 | Japan | 48-82950 |
| Aug. 2, 1973 | Japan | 48-87054 |
| May 31, 1973 | Japan | 48-64631[U] |
| May 31, 1973 | Japan | 48-64632[U] |

[52] U.S. Cl. .................................. 358/4; 358/31
[51] Int. Cl.² ................................ H04N 9/02
[58] Field of Search ............. 358/4, 31; 178/DIG. 3, 178/6.6 A, 6.6 DD

[56] References Cited
UNITED STATES PATENTS

| 3,764,739 | 10/1973 | Faroudja | 358/4 |
| 3,812,523 | 5/1974 | Narahara | 358/4 |

*Primary Examiner*—Benedict V. Safourek
*Assistant Examiner*—Mitchell Saffian
*Attorney, Agent, or Firm*—Stevens, Davis, Miller & Mosher

[57] ABSTRACT

A video signal processing system for reproducing a colorplexed composite video signal obtained by colorplexing a frequency shifted chrominance signal shifted to a lower frequency band and a luminance signal by using frequency interlacement, the composite video signal being recorded in the form of an angular modulation signal on a recording medium, and converting the reproduced signal into a standard color television signal. In this system, the chrominance signal band component is extracted from the reproduced composite video signal, and the extracted signal is frequency converted into a signal in the frequency band of the chrominance signal in the standard color television signal. The frequency converted signal is then coupled to a comb filter to separate the chrominance signal. The chrominance signal thus obtained is combined with a signal obtained by removing the chrominance signal component from the reproduced composite video signal, thereby recovering the standard color television signal.

16 Claims, 23 Drawing Figures

$$\begin{cases} f_s = f_H/2 \times 455 = 3.579545 \text{ MHz} \\ f_{s1} = f_H/2 \times 195 = 1.534090 \text{ MHz} \\ f_H : \text{HORIZONTAL LINE-SCANNING FREQUENCY} \end{cases}$$

ed signal into a
VIDEO SIGNAL PROCESSING SYSTEM FOR REPRODUCING A VIDEO SIGNAL FROM A BANDWIDTH LIMITED RECORDED SIGNAL This invention relates to signal processing systems for recording and reproducing systems where the bandwidth of the recorded signal is limited and, more particularly, to a signal processing system for reproducing a colorplexed composite video signal containing a chrominance signal frequency shifted to lower frequencies to reduce the bandwidth of the recorded signal, the frequency shifted chrominance signal being colorplexed with the luminance signal by using frequency interlacement, the colorplexed composite video signal being recorded as angular modulation on a recording medium, and converting the reproduced signal into a standard color television signal.

Figure 1A:
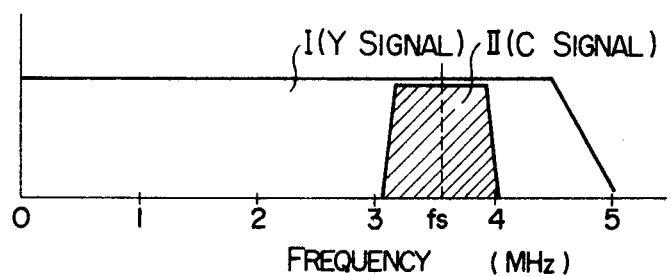
FIG. 1a is a diagram showing bandwidth requirements of the NTSC color television signal which is one of the standard color television signals.
Figure 1B:
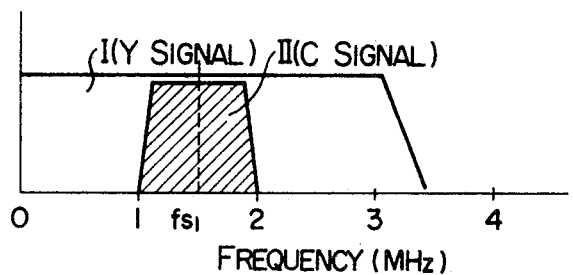
FIG. 1b is a diagram showing bandwidth requirements of a composite video signal with the chrominance signal frequency shifted to a lower frequency band and the luminance signal combined with the frequency shifted chrominance signal.

There has heretofore been proposed a video disc type video signal recording and reproducing system, in which a color television signal having bandwidth requirements as shown in FIG. 1a is recorded after frequency modulation on a disc-like recording medium by a suitable method. On the reproducing side, the FM signal is detected and demodulated to reproduce the original signal for display on television receiver. In the system of this type, the bandwidth of the recorded video signal is limited due to limitations imposed upon the recording density of the recording medium. For this reason and also from the necessity of minimizing the adverse effects of interference between the color subcarrier signal and the FM carrier signal introduced at the time of the frequency modulation, there has been proposed a recording and reproducing system, in which the chrominance signal is frequency shifted to a lower frequency band as shown in FIG. 1b, the frequency shifted chrominance signal being combined by using frequency interlacement with the luminance signal to produce a composite video signal like the ordinary color television signal, the resultant composite video signal being recorded and reproduced. In this case, the burst signal is frequency shifted to a lower frequency as well as the color subcarrier. Since frequency interlacement is employed here, the frequency $f_{S1}$ of the aforementioned frequency shifted color subcarrier wave is selected to be an odd number multiple of one half the horizontal line-scanning frequency $f_H$ like the original color subcarrier frequency $f_S$. In the following description, $f_{S1}$ is assumed, as a specific example, to be $$f_{S1} \approx (f_H/2) \times 195 = 1.53 \text{ MHz}$$

Figure 2:
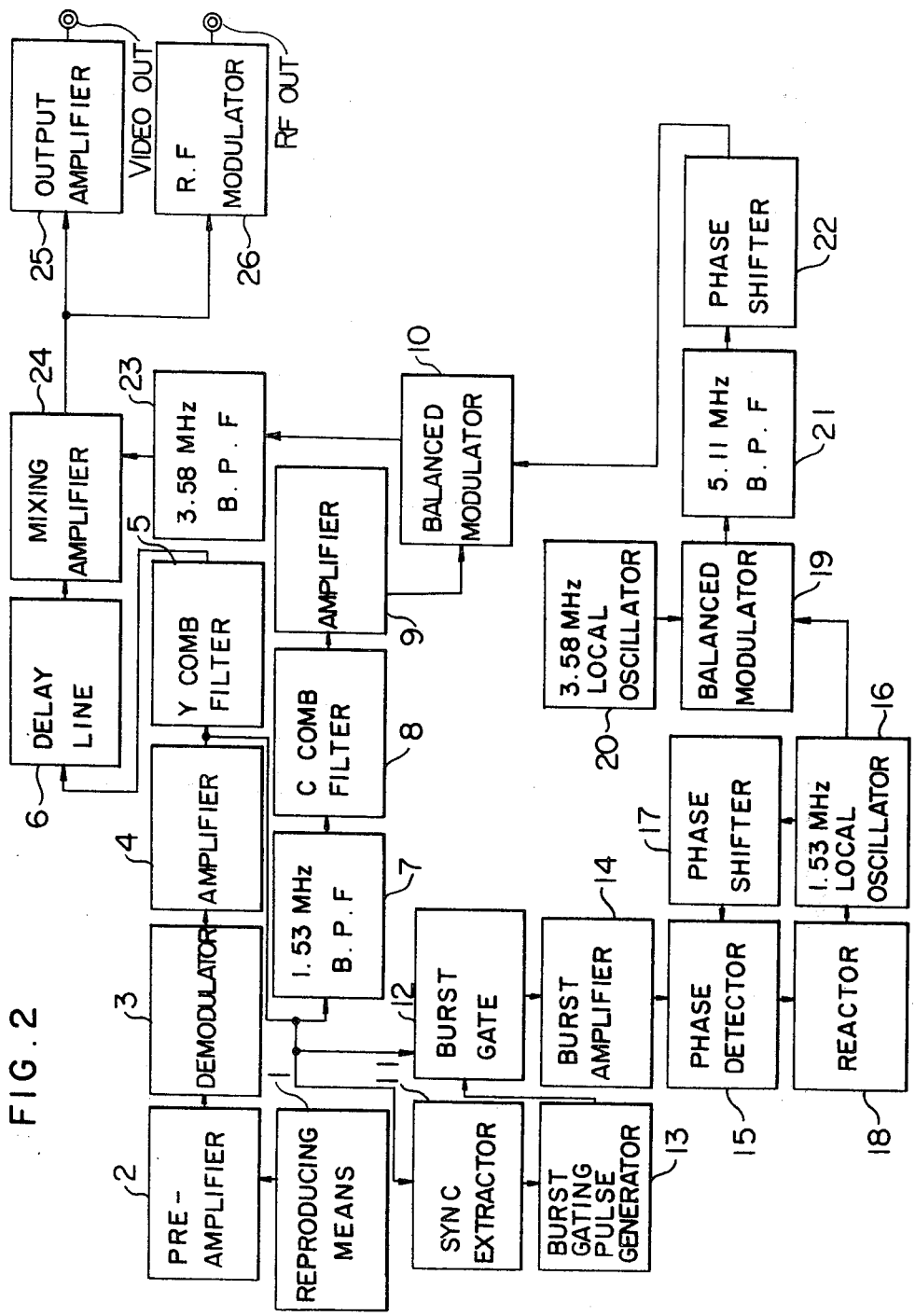
FIG. 2 is a block diagram showing the basic circuit construction of the video signal processing system according to the invention.

FIG. 2 shows in block form the basic circuit construction of a video signal processing system to be employed for the above recording and reproducing system.

Reference numeral 1 designates a means which detects signals from the recording medium and converts them to electrical signals. The output of the reproducing means 1 is coupled through a pre-amplifier 2, a demodulator 3 and an amplifier 4. The output of the amplifier 4 is decoded into the NTSC color television signal through the following processing.

The output of the amplifier 4 is first coupled to a Y type comb filter 5, which removes the chrominance signal and burst signal within the frequency band of 1.53 MHz ± 0.5 MHz without affecting the luminance signal component within this band in any way, thus selectively passing the luminance signal which is added to a delay line 6. Meanwhile, the output of the amplifier 4 is also coupled to a band-pass filter 7 selectively passing the signal within the afore-mentioned frequency band of 1.53 MHz ± 0.5 MHz. The output of the bandpass filter 7 is coupled to a C type comb filter, which removes the luminance signal component within the aforesaid band to derive the chrominance signal at 1.53 MHz ± 0.5 MHz and burst signal at 1.53 MHz. The output of the C type comb filter 8 is coupled through an amplifier 9 to a balanced modulator 10. The output of the amplifier 4 is further applied to a synchronizing signal extractor 11 and a burst gate 12. The synchronizing signal extractor 11 extracts the sinchronous signal which is applied to a burst gating pulse generator 13. The burst gate 12 extracts the burst signal under the control of the output of the burst gating pulse generator 13. The burst signal thus extracted is coupled through a burst amplifier 14 to a phase detector 15. Meanwhile, the output of a 1.53-MHz local oscillator 16 is coupled through a phase shifter 17 to the phase detector 15 for phase comparison with the burst amplifier output. The phase detector 15 produces a control signal corresponding to the phase difference between the two inputs, and this control signal is applied through a reactor 18 to the 1.53-MHz local oscillator 16 to lock the frequency and phase of the oscillator output to those of the extracted burst signal. This 1.53-MHz local oscillator output signal (at $f_{S1}$) locked in frequency and phase to the extracted burst signal is added to a balanced modulator 19 for balanced modulation with a reinserted standard color television signal color subcarrier wave (at frequency $f_S$) produced from a 3.58-MHz local oscillator 20. The output of the balanced modulator 19 is applied to a bandpass filter 21, which extracts a single frequency signal at about 5.11 MHz ($f_{S2} f_S + f_{S1}$), that is, at the sum of the frequencies of the two inputs to the balanced modulator 19. This single frequency signal is coupled through a phase shifter 22 to the afore-mentioned balanced modulator 10 for balanced modulation with the chrominance signal at 1.53 MHz ± 0.5 MHz and burst signal at 1.53 MHz from the amplifier 9. The output of the balanced modulator 10 is applied to a bandpass filter 23, which extracts the difference combination of the two inputs to the balanced modulator 10, that is, the chrominance signal at 3.58 MHz ± 0.5 MHz and burst signal at 3.58 MHz. This output of the bandpass filter 23 is applied to a mixing amplifier 24 for combining it with the luminance signal output of the delay line 6 compensated for the delay with respect to the chrominance and burst signals. The output of the mixing amplifier 24 constitutes the NTSC color television signal, and it is coupled through an output amplifier 25 to a video output terminal and also through a r-f modulator 26 to a r-f output terminal. Each of the outputs is connected to antenna terminals of a monitor TV set or television receivers.

Figure 3A:
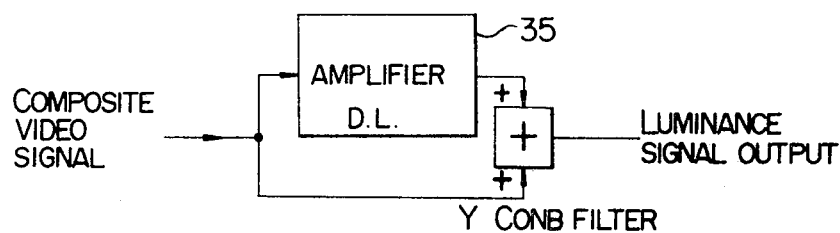
FIGS. 3a and 3b are block diagrams showing respective comb filters.
Figure 3B:
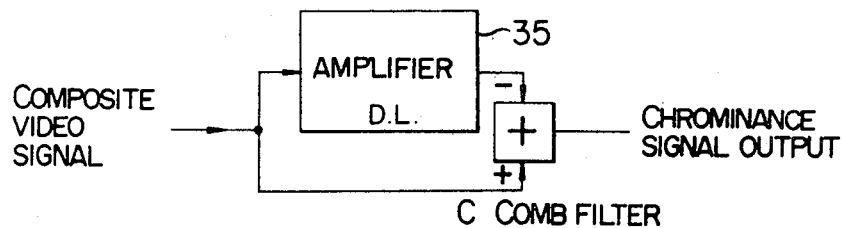
Figure 4A:
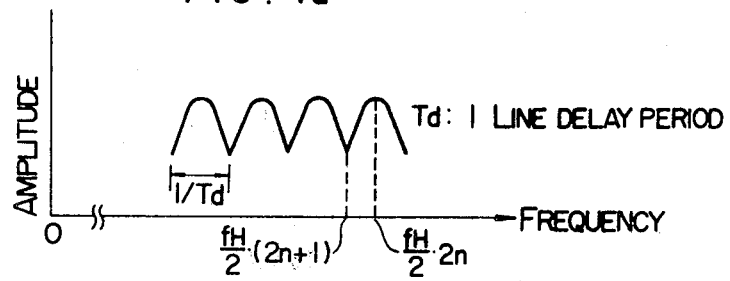
FIGS. 4a and 4b are graphs showing frequency characteristics of the comb filters of FIGS. 3a and 3b.
Figure 4B:
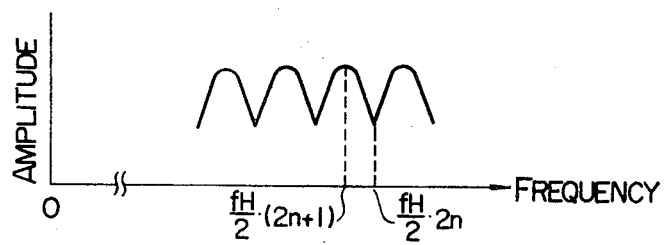

The above processing of the video signal necessarily involves the separation of luminance and chrominance signals, and this is achieved by means of comb filters using a one horizontal scan-line (1 H) delay line or one field delay line. FIGS. 3a and 3b outline the basic construction of Y type and C type comb filters, and FIGS. 4a and 4b show their amplitude-frequency characteristics. Their operational principles reside in using the vertical correlation (line correlation or field correlation) of the composite video signal for separating the luminance signal and chrominance signal which are in frequency interlaced relation to each other. More particularly, since the color subcarrier wave in one horizontal scan line is 180° out of phase with that in the next line, by adding the composite video in one line and that in the preceding line in the same phase relation the chrominance signal cancels out to obtain the luminance signal, as will be seen from FIG. 3a, while adding the composite video in one line and that in the preceding line in the opposite phase relation leads to cancellation of the luminance signal to obtain the chrominance signal, as will be seen from FIG. 3b. At present, commercially available 1-H delay lines for the comb filters are those for the NTSC system (with frequency coverage centered at 3.58 MHz) and those for the PAL system (with frequency coverage centered at 4.43 MHz). In case of those for the NTSC system, the frequency coverage is from about 2.8 MHz to about 4.4 MHz. Therefore, when separating a signal which is obtained by a process such as frequency shifting the chrominance signal to a lower frequency band prior to colorplexing with the luminance signal in frequency a interlaced relation, a 1-H delay line with a frequency coverage corresponding to the bandwidth of the chrominance signal and centered at the frequency of the lower frequency shifted color subcarrier is required. For example, in the afore-mentioned system a 1-H delay line with a coverage band centered at 1.53 MHz and extending at least to ± 0.5 MHz from that frequency is required. Such a 1-H delay line would call for entirely different design conditions and construction from those of the presently available 1-H delay lines, so that it would be considerably expensive due to considerable expenditure required for its development and possibly, comparatively high cost of its manufacture. In this respect, a wide cost reduction will be realized if it is made possible to use the commercially available 1-H delay line that is used for video tape recorders and the like and has considerable versatility.

In another aspect, in the case of the circuit construction of FIG. 2 with frequency deviations introduced into the reproduced signal due to such factors as fluctuation of the disc speed the separation of the luminance signal and chrominance signal in the comb filters would be deteriorated resulting in the deterioration of the signal-to-noise ratio in the picture reproduction.

In the light of the above aspects, it is an object of the invention to provide means for separating the chrominance signal and luminance signal colorplexed together in frequency interlaced relation to each other, which means ensures steady and stable separation irrespective of time axis fluctuation components which may be included in the colorplexed composite video.

Another object of the invention is to provide means for converting a composite color video signal produced by using frequency interlacement into a Standard color television signal.

The above and other objects of the invention will become more apparent from the following description.

The video signal processing system according to the invention enables the use of a versatile 1-H delay line in the construction of the comb filter, so that the system can be provided inexpensively. Also, it enables to steadily obtain high picture quality without deterioration of the signal-to-noise ratio in the picture reproduction irrespective of frequency deviations introduced into the reproduced signal due to such causes as fluctuation of the disc speed.

Figure 5:
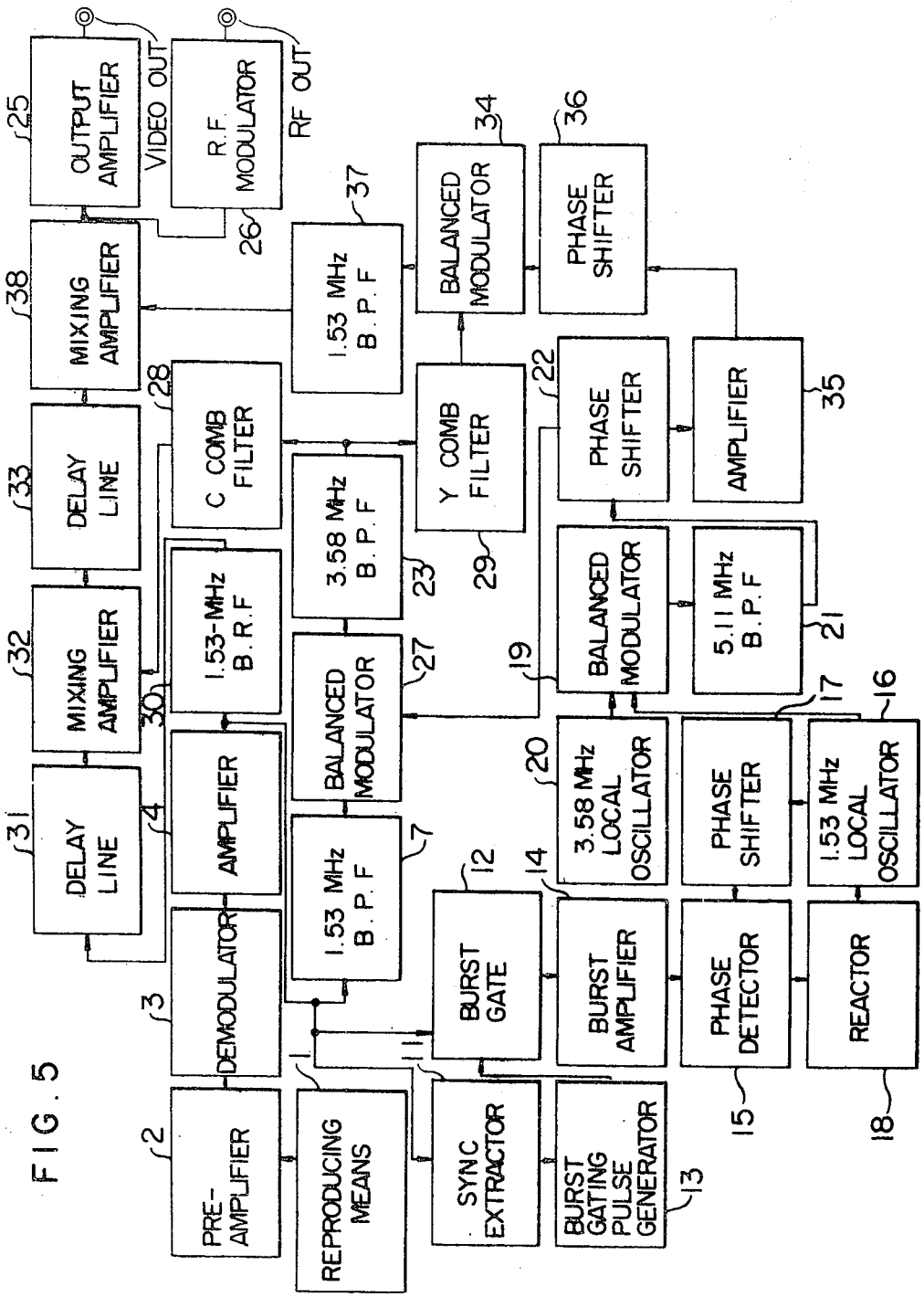
FIGS. 5 to 17 and 20 are block diagrams showing embodiments of the video signal processing system according to the invention.

FIG. 5 shows a block diagram of one embodiment of the invention. In the Figure, the same blocks as those in FIG. 2 are designated by like reference numerals and descriptions thereof are omitted. Here, the output of amplifier 4 is applied to a bandpass filter 7 to obtain a signal within the chrominance signal frequency band (1.53 MHz ± 0.5 MHz). This signal is applied to a balanced modulator 27 for balanced modulation with the 5.11 MHz $(f_S + f_{S1})$ signal from phase shifter 22. The output of the balanced modulator 27 is applied to bandpass filter 23 to extract the difference combination (at 3.58 MHz ± 0.5 MHz) of the two inputs to the balanced modulator 27. This difference combination of signals within the frequency range of 3.58 MHz ± 0.5 MHz contains the chrominance signal component (including burst signal) with the color subcarrier shifted to 3.58 MHz and the luminance signal component (at 3.58 ± 0.5 MHz) corresponding to one previously within the range of 1.53 ± 0.5 MHz, and it is coupled to a C type comb filter 28 and a Y type comb filter 29 to separate respectively the chrominance and luminance signal components. The output of the amplifier 4 is meanwhile coupled to a band-rejection filter 30 to remove its chrominance signal component within the range of 1.53 MHz ± 0.5 MHz. At this time, the luminance signal component within the same frequency range is also removed, so that it is necessary to subsequently make up for the removed luminance signal component. The output of the band-rejection filter 30 is coupled to a delay line 31 to compensate for delay of luminance signal with respect to the chrominance signal, and the output of the delay line 31 is applied to a mixing amplifier 32 for combining it with the chrominance signal output of the C type comb filter 28, the output of the mixing amplifier 32 being applied to a second delay line 33. The output of the Y type comb filter 29 is applied to a balanced modulator 34 for balanced modulation with the output signal (at 5.11 MHz) of a phase shifter 36, to which is added the output of an amplifier 35 amplifying the output of phase shifter 22. The output of the balanced modulator 34 is applied to a band-pass filter 37 to extract the difference combination (at 1.53 MHz ± 0.5 MHz) of the two inputs to the balanced modulator 34. This difference combination output of the band-pass filter 37 corresponds to the luminance signal component removed by the band-rejection filter 30. Thus, it is combined with the output of the delay line 33 in an adder amplifier 38 to obtain a perfect color television signal output.

In this mode of recovering the composite video signal comb filters not using any 1-H delay line with the band coverage centered at 1.53 MHz but using a versatile 1-H delay line with the coverage band centered at 3.58 MHz can be used, so that it is possible to provide an inexpensive video signal processing system.

In the above video signal processing system of FIG. 5, the frequency and phase of the color sub-carrier signal and burst signal to be recovered may be subject to deviations due to such causes as fluctuations of the disc speed at the time of recording or at the time of reproduction. Even with such deviations it is possible to reproduce a steady color television signal since the detected color subcarrier signal and burst signal can be replaced with the output signal of a local stable crystal oscillator oscillating at the color subcarrier frequency. This respect will now be discussed in further detail. If the recovered color subcarrier frequency $f_{S1}$ contains a frequency deviation component $\pm \Delta f_{S1}$, the recovered burst signal will also contain the frequency deviation component $\pm \Delta f_{S1}$ since both the color subcarrier signal and burst signal will be subjected to the same frequency deviations. In this case, the output signal of the 1.53 MHz local oscillator 16, which is locked to the frequency and phase of the recovered burst signal as mentioned earlier, will also be at the frequency $f_{S1} \pm \Delta f_{S1}$. When this signal is combined in balanced modulation with the signal (at the frequency $f_S$) from the local oscillator 20, the sum combination output of the band-pass filter 21 will be at the frequency $f_S + (f_{S1} \pm \Delta f_{S1})$. When this sum combination signal is combined in balanced modulation in the balanced modulator 27 with the chrominance signal and burst signal in the output of the band-pass filter 7, the color subcarrier frequency of the difference combination output of the band-pass filter 23 will be $$\{f_S + (f_{S1} \pm \Delta f_{S1})\} - (f_{S1} \pm \Delta f_{S1}) = f_S.$$

This means that the detected color subcarrier wave and burst signal are replaced with the output signal of the 3.58 MHz local oscillator.

Thus, the video signal processing system according to the invention enables to ensure steady reproduction of the color picture irrespective of deviations of the frequencies of the recovered chrominance signal and burst signal due to such causes as fluctuations of the disc speed.

Figure 6:
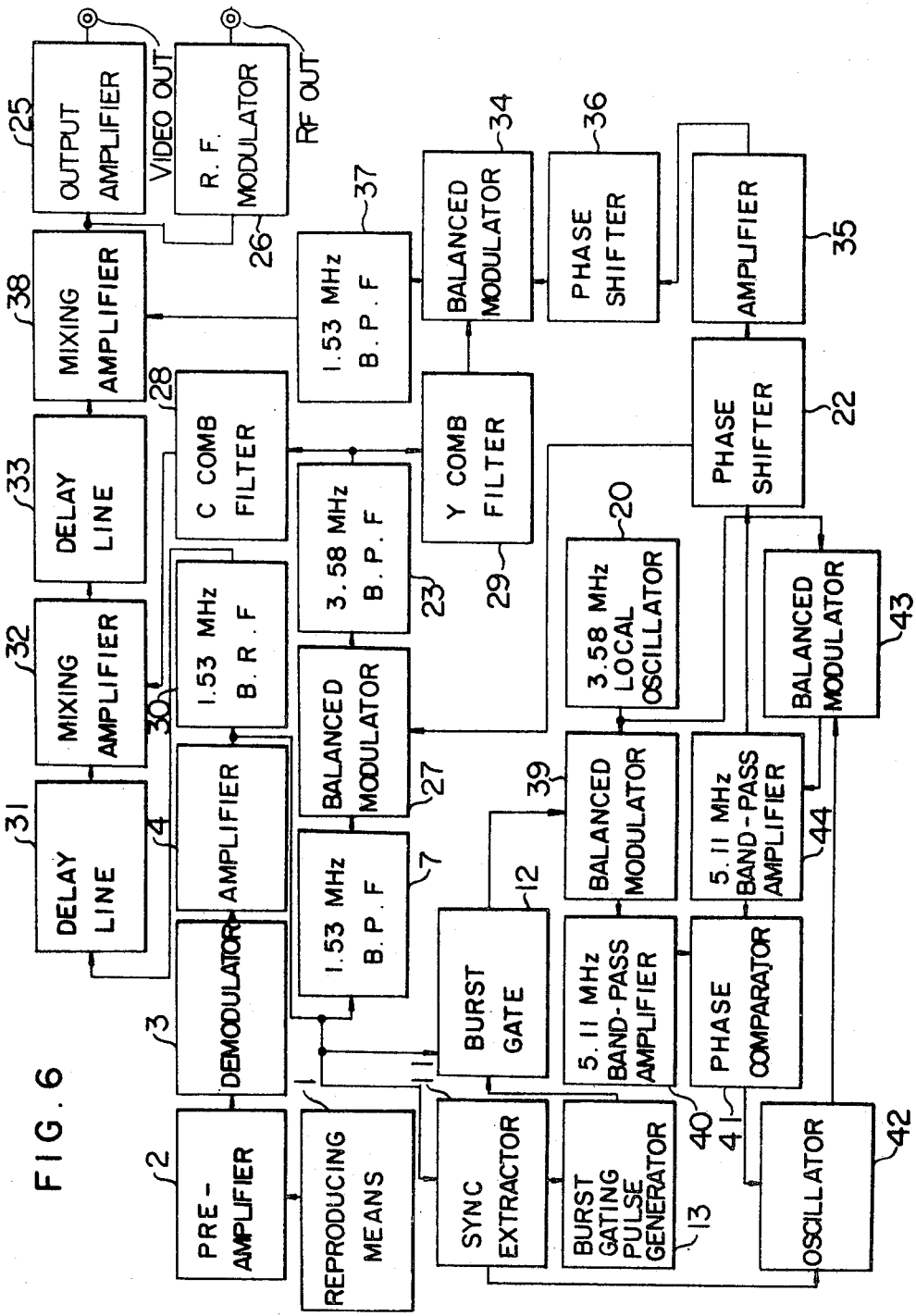

FIG. 6 shows another embodiment of the invention. In this embodiment, the burst signal extracted through burst gate 12 is applied to a balanced modulator 39 for balanced modulation with a reinserted color subcarrier wave of the standard color television signal ($f_S \approx 3.58$ MHz in the case of the NTSC system) produced from the local oscillator 20. The output of the balanced modulator 39 is applied to a band-pass amplifier 40 to obtain the sum combination (at $f_{S2} = f_S + f_{S1}$) of the two inputs to the balanced modulator 39, the output of the band-pass amplifier 40 being coupled through a phase comparator 41 whose output is applied to an AFPC oscillator 42. Meanwhile, the synchronizing signal separated by synchronizing extractor 11 is applied to the AFPC oscillator 42 to control the oscillation frequency of the AFPC oscillator 42 according to the variation of the synchronizing signal frequency. The output of the oscillator 42 is applied to a balanced modulator 43 for balanced modulation with the output of the oscillator 20, and the sum combination of the two signals is extracted through band-pass amplifier 44 and applied to the phase comparator 41 for phase comparison with the frequency shifted burst signal output of the band-pass amplifier 40. The output of the phase comparator 41 represents the phase difference between the two inputs, and it is applied as a control signal to the oscillator 42.

With this construction, the frequency and phase of the output of the oscillator 42 can be locked to those of the extracted burst signal, so that the output signal of the band-pass amplifier 44 can be regarded to be the sum combination of the extracted burst signal and the color subcarrier of the standard color television signal. Thus, the recovered chrominance signal can be converted into the chrominance signal of the standard color television signal by taking the difference combination of the output of the band-pass amplifier 44 and the recovered chrominance signal.

With the above construction, the number of cycles of the frequency shifted burst signal admitted to the phase comparator 41 is, since $$f_{S2} \approx 3.58 + 1.53 = 5.11 \text{ (MHz)}$$

in the case of the NTSC system, $$8 \times 5.11/3.58 = 11.4 \text{ (cycles)},$$

so that the output of the oscillator 42 can be steadily controlled with improved precision of the phase comparison. In addition, since the oscillation frequency of the oscillator 42 is adapted to be controlled according to the frequency variation of the separated synchronizing signal whose frequency deviation rate is regarded to be the same as that of the extracted burst signal, the oscillation frequency of the oscillator 42 will never greatly depart from the frequency of the extracted burst signal. Thus, it is possible to have the frequency and phase of the output of the oscillator 42 sufficiently follow the frequency changes in the extracted burst signal over a wide range of frequency variation.

Figure 7:
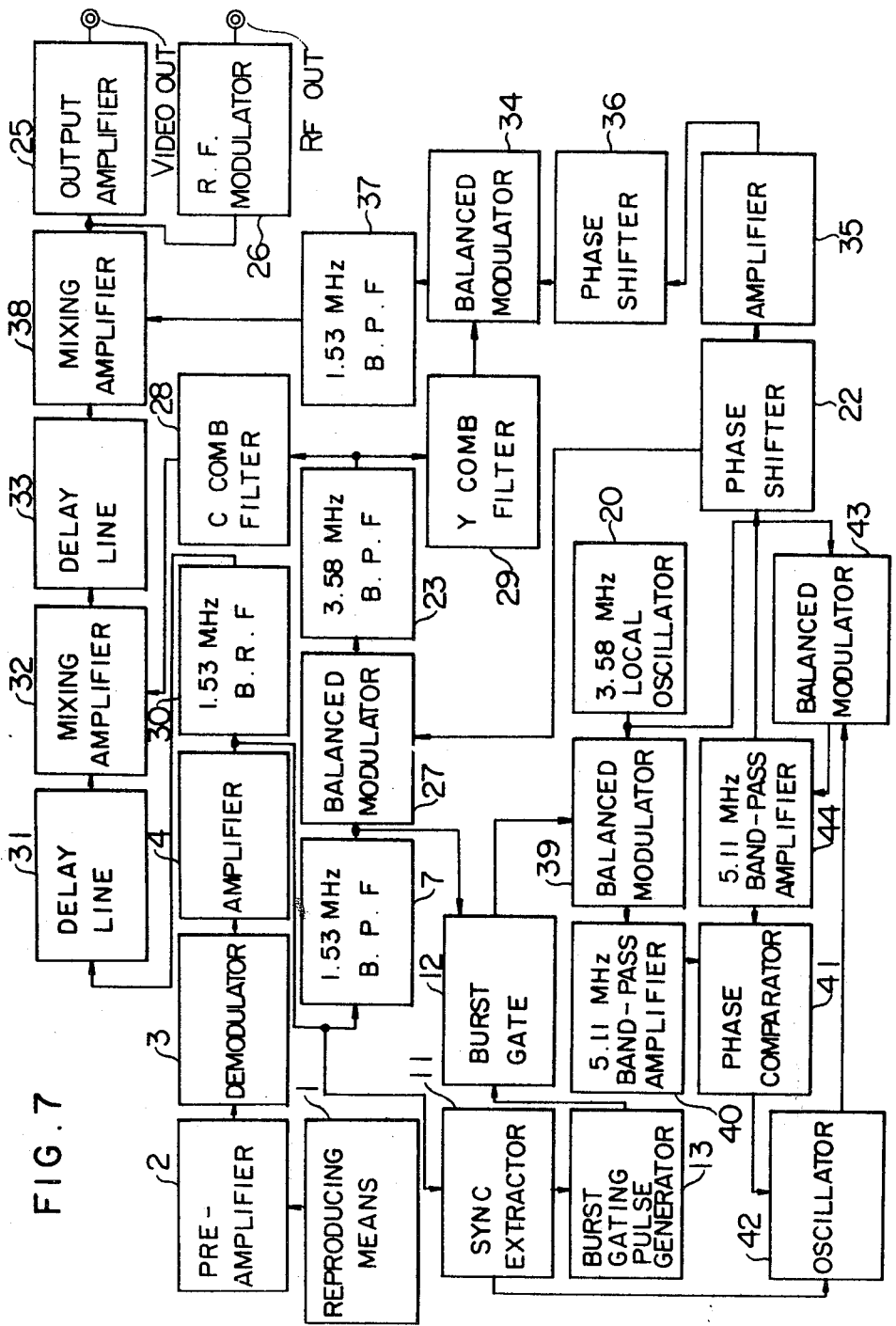
Figure 8:
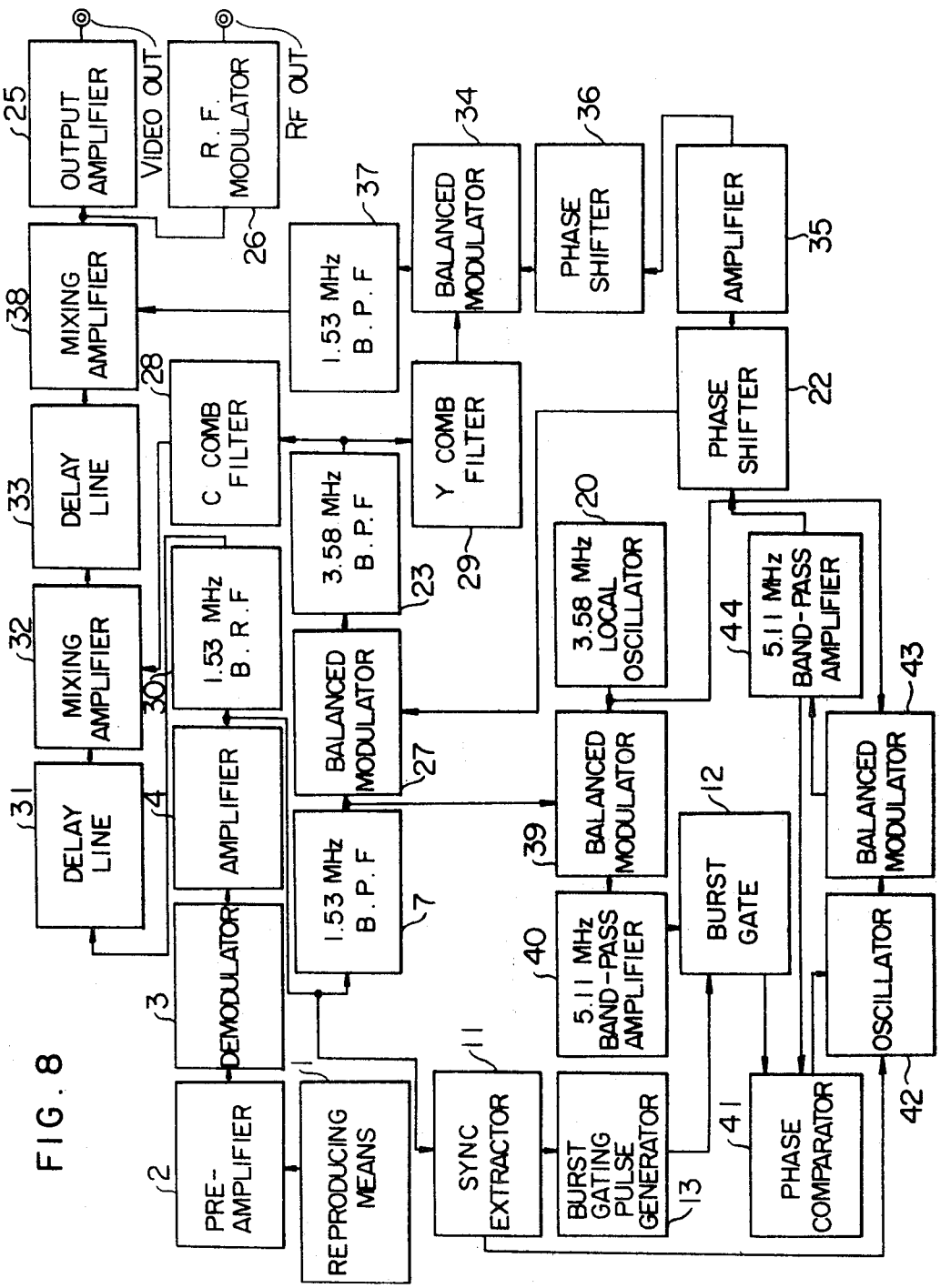
Figure 9:
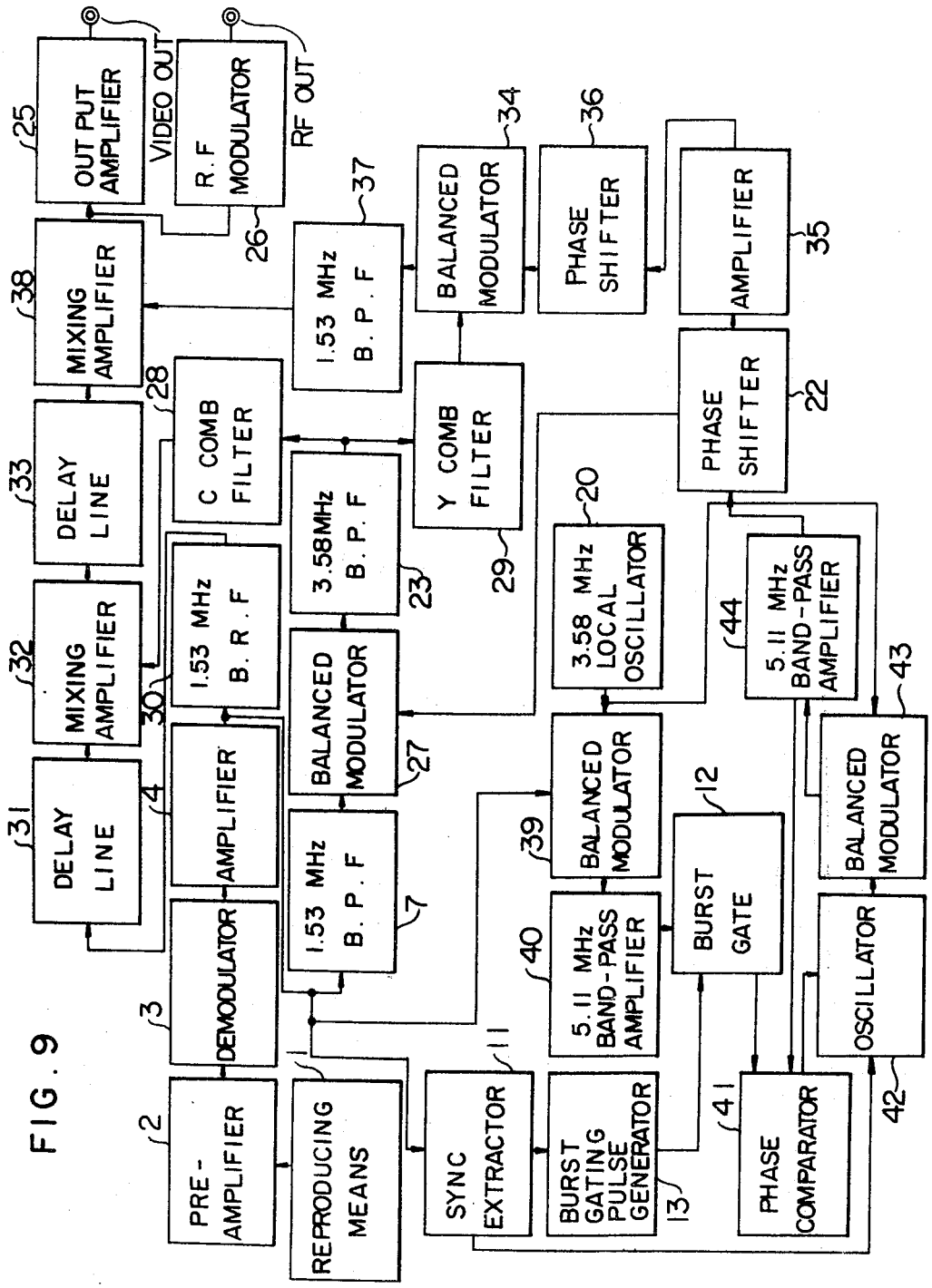

FIGS. 7 to 9 show modifications of the embodiment of FIG. 6. In the modification of FIG. 7, the output of the band-pass filter 7 is coupled as an input to the burst gate 12, and the same effect as in the preceding embodiment of FIG. 6 can be obtained. In the case of FIG. 8, the output of the band-pass filter 7 in the recorded chrominance signal band is combined in balanced modulation with the signal from the oscillator 20, and the frequency shifted burst signal is obtained from the resultant sum combination of signals. Again, the same effect as in the embodiment of FIG. 6 can be obtained here. In the case of FIG. 9, the input signal to the balanced modulator 39 is obtained from the input side of the band-pass filter 7, and otherwise the construction here is the same as in the preceding embodiment of FIG. 8.

The AFPC oscillator 42 presents a problem in that its stability with respect to temperature changes is reduced with increasing oscillation frequency, and its design encounters extreme difficulties in respect of temperature compensation. FIGS. 10 to 13 show embodiments, which provide improvements over this problem.

Figure 10:
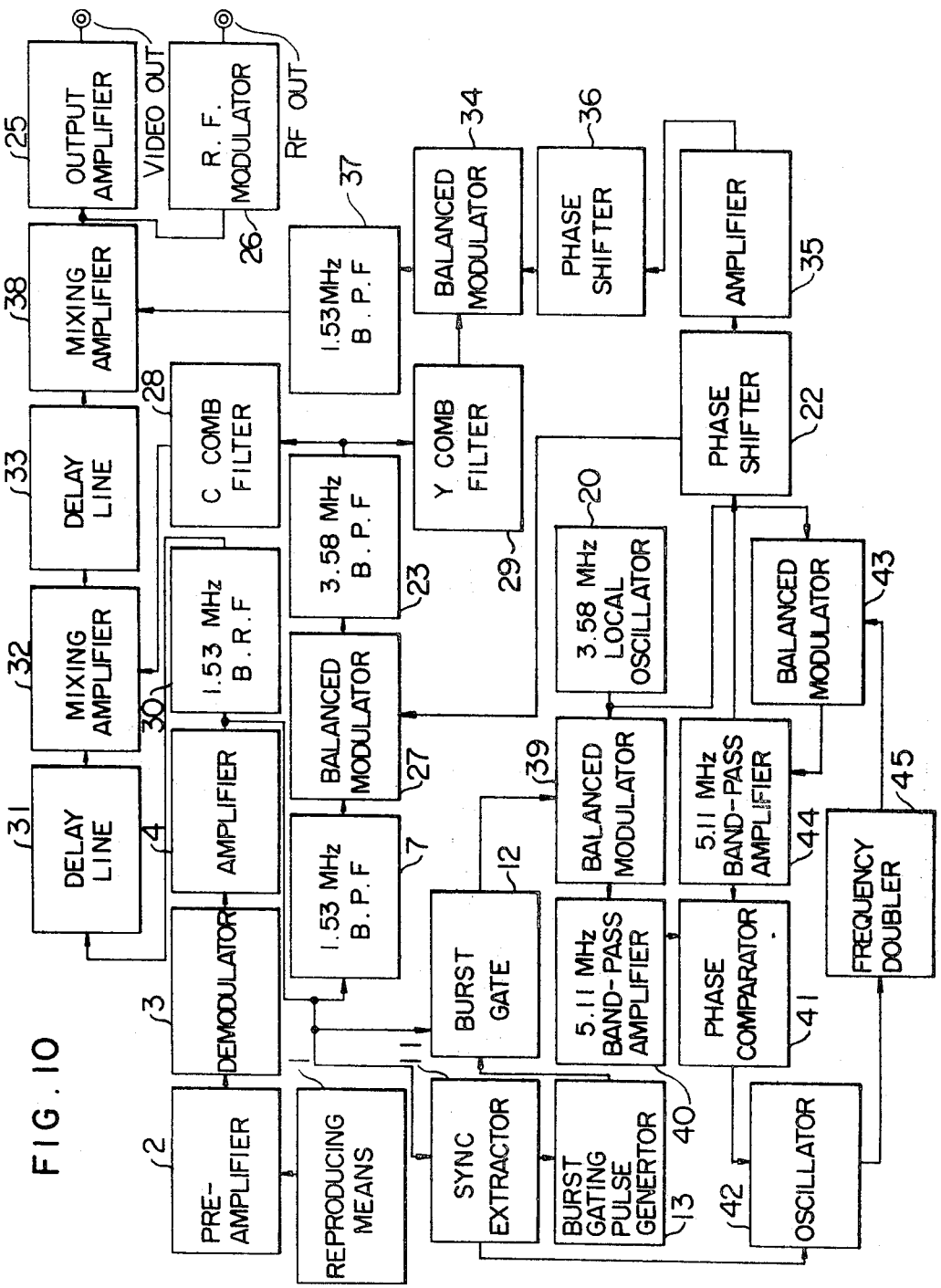

In the embodiment of FIG. 10, the oscillation frequency of AFPC oscillator 42 is designed to be substantially one half the frequency of the recovered burst signal, and the output of this oscillator is coupled to a frequency doubler 45 to double its frequency. The output of the frequency doubler 45 is applied to balanced modulator 43 for balanced modulation with the output of the oscillator 20, and the sum combination of the two signals is extracted through band-pass amplifier or band-pass filter 44 and added to phase comparator 41 for phase comparison with the frequency shifted burst signal output of the band-pass amplifier 40. The phase comparator output represents the phase difference between the two compared inputs, and it is applied as the control signal to the oscillator 42. Meanwhile, the synchronizing signal separated by synchronizing signal separator 11 is added to the AFPC oscillator 42 to control the oscillation frequency thereof according to the variation of the synchronizing signal frequency.

With this construction, the oscillation frequency of the oscillator 42 need be only one half the frequency of the recovered burst signal. Thus, it is possible to design a circuit having stable performance irrespective of temperature changes.

While the frequency doubler 45 is used in the embodiment of FIG. 10, it is by no means limitative, and it is of course possible to use frequency multipliers of higher frequency multiplication factors, for instance 3, 4, 5, . . . , whereby the oscillation frequency of the oscillator 42 may be designed to be ⅓, ⅛, 1/5, . . . , of the frequency of the recovered burst signal.

Figure 11:
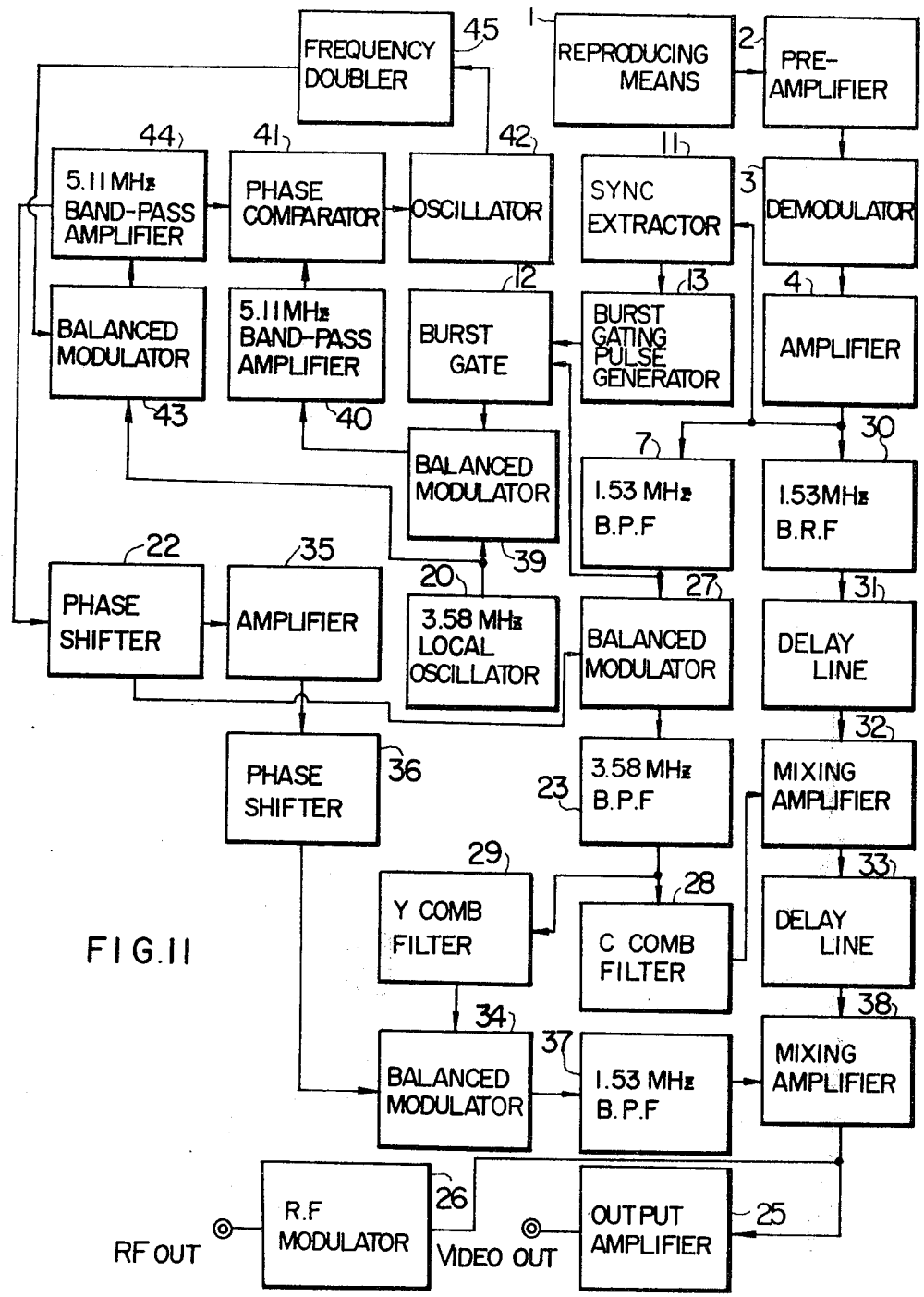
Figure 12:
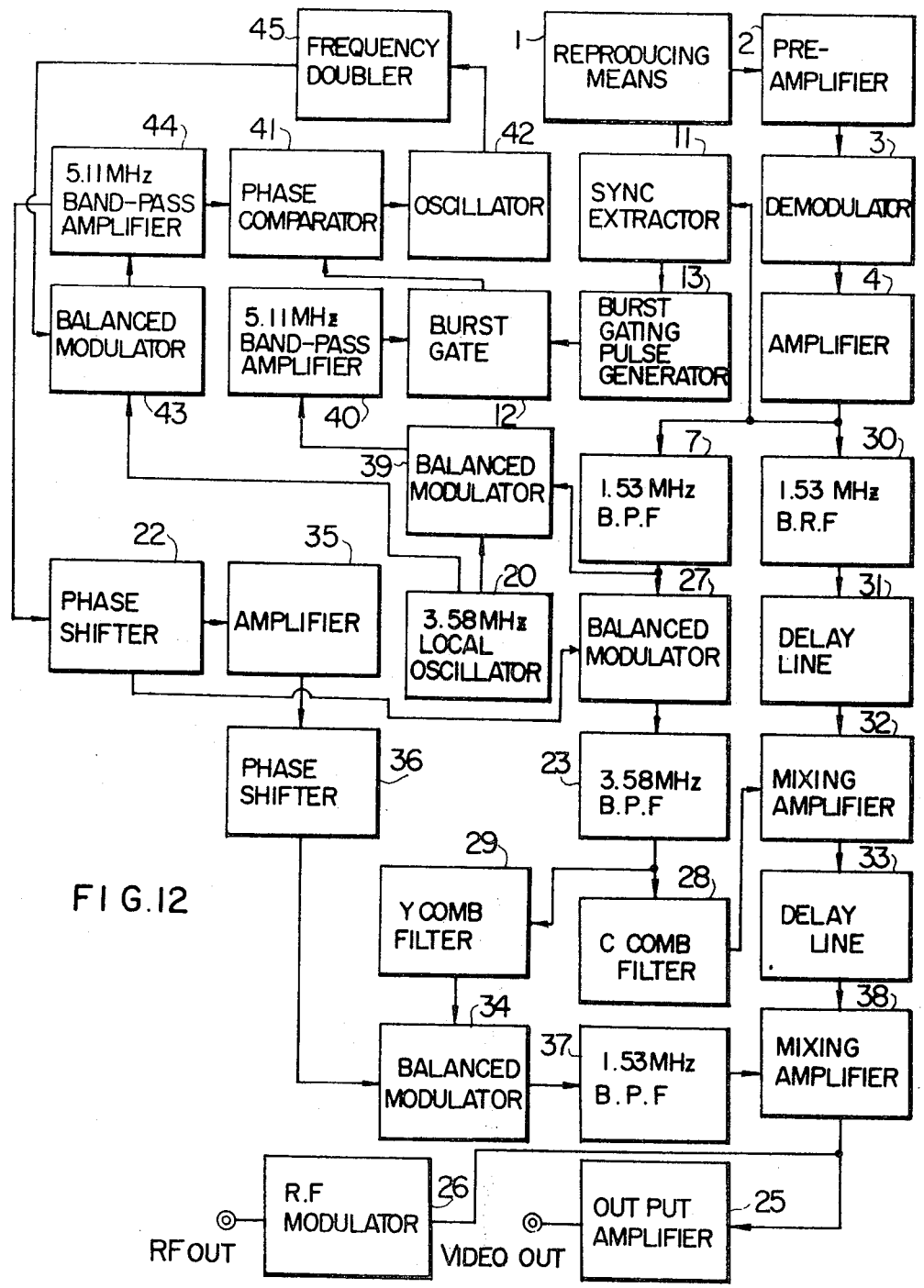
Figure 13:
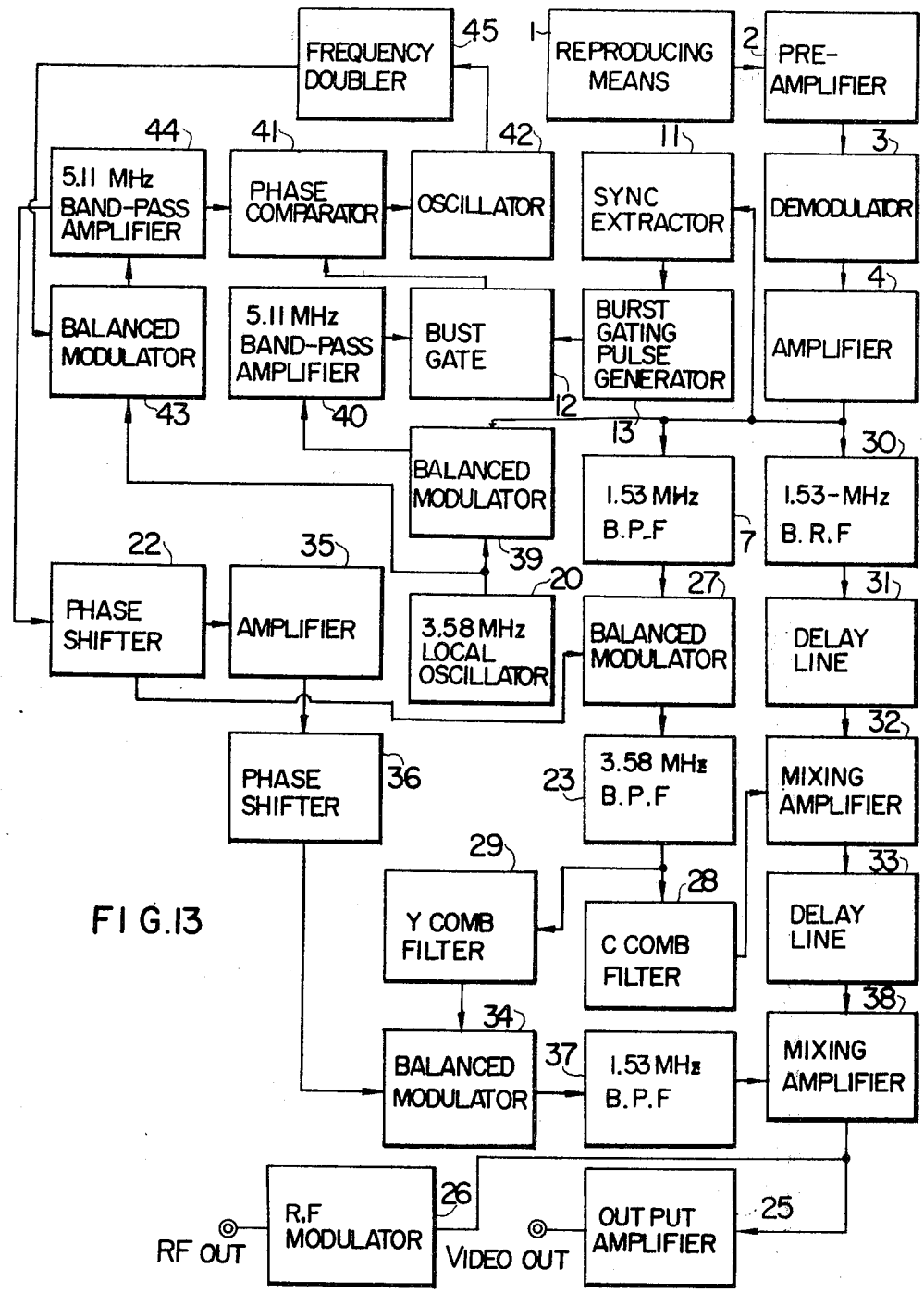

The embodiments of FIGS. 11 to 13 are modifications of the preceding embodiment of FIG. 10 and are essentially based upon the same technical principles. In the case of FIG. 11, the output of band-pass filter 7 is used as an input to burst gate 12. In the case of FIG. 12, the output of band-pass filter 7 in the recorded chrominance band is combined in balanced modulation with the output signal of oscillator 20, and the frequency shifted burst signal is obtained from the resultant sum combination of signals. In the case of FIG. 13 the input signal to balanced modulator 39 is obtained from the input side of band-pass filter 7.

The circuit constructions of FIGS. 10 to 13 can thus operate steadily irrespective of temperature changes and permit to obtain a continuous signal well following the frequency and phase of the recovered burst signal, so that it is possible to stabilize the quality of picture reproduction.

Figure 14:
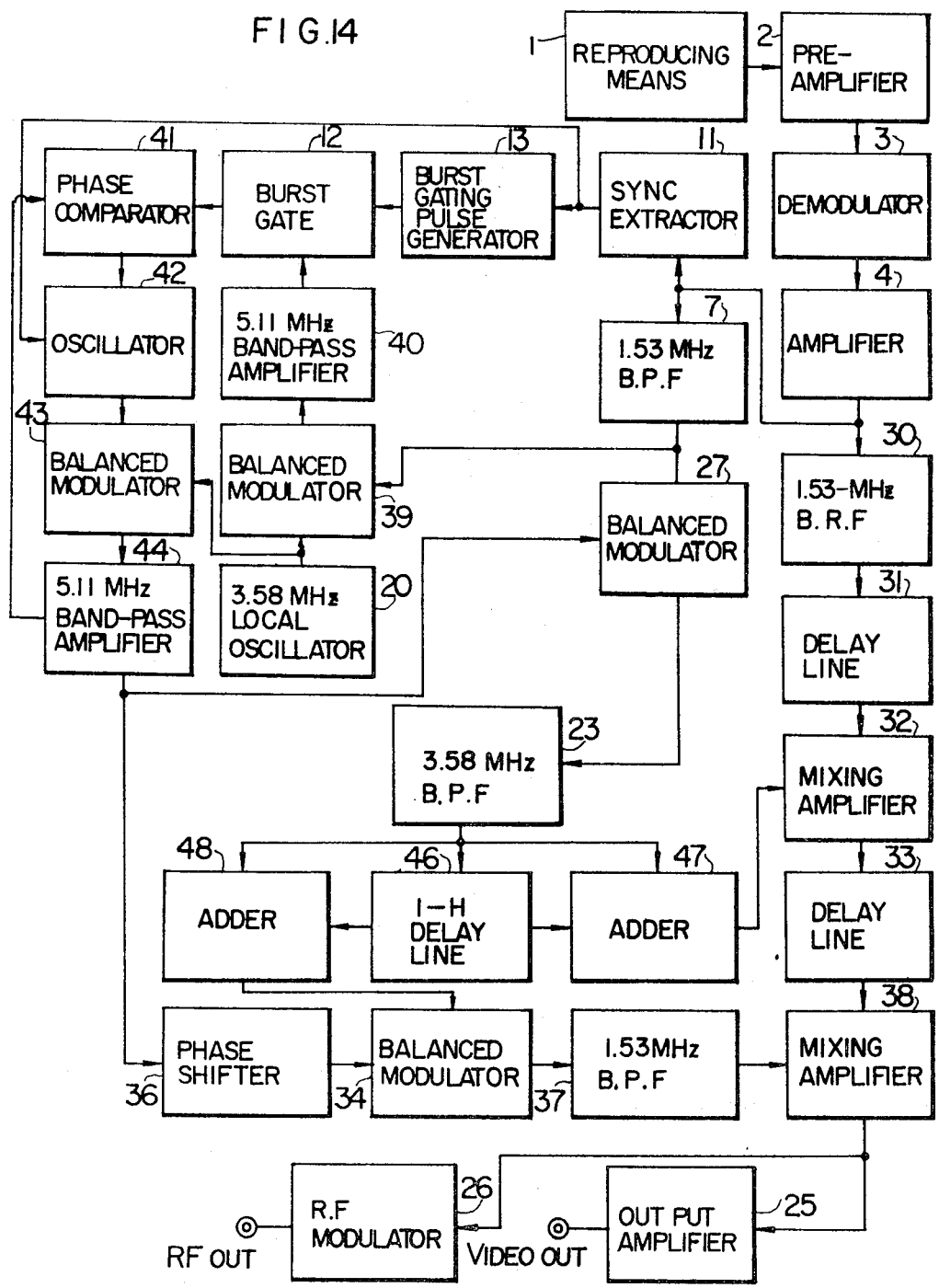
Figure 15:
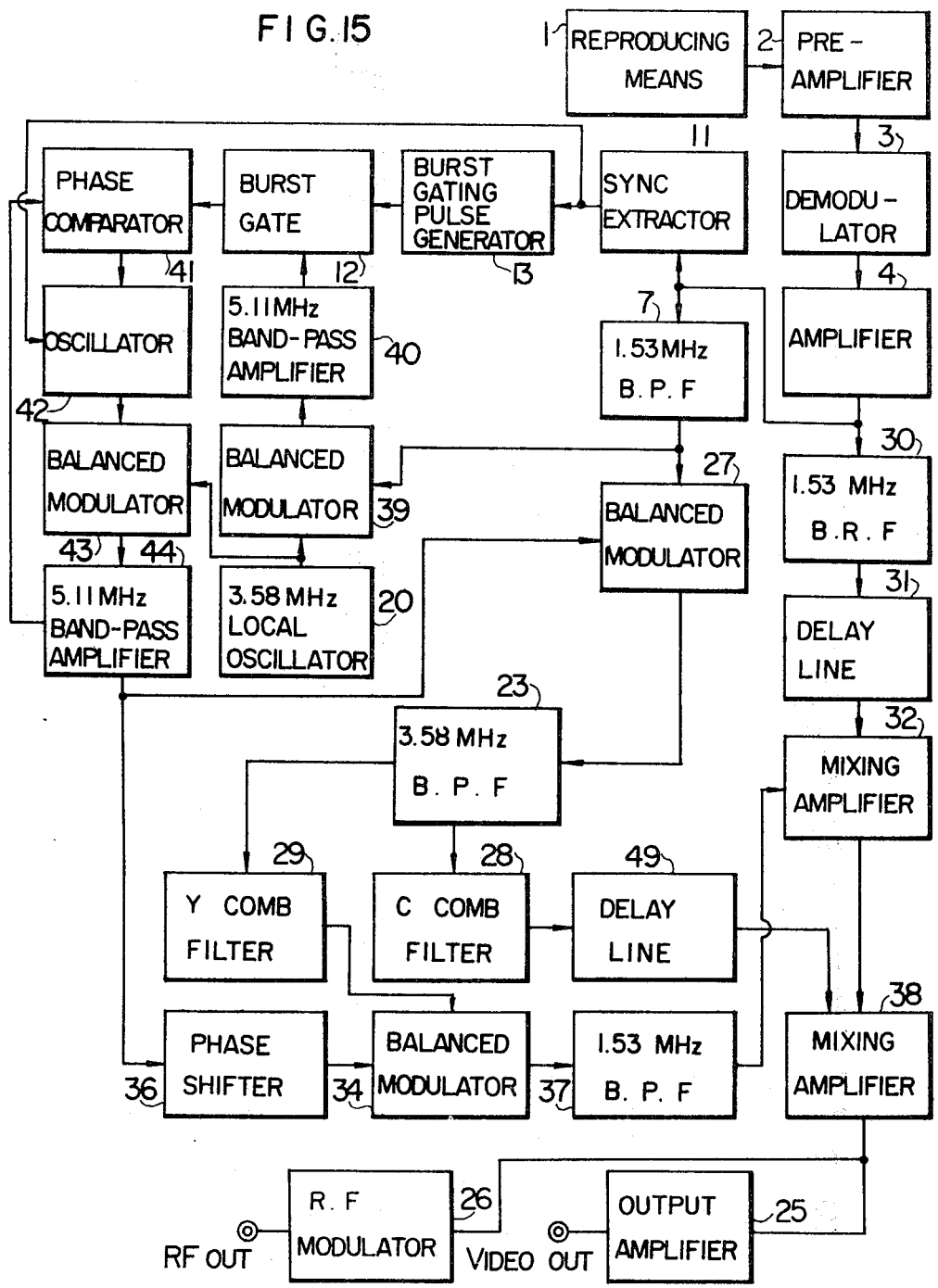

FIGS. 14 and 15 show further modifications of FIG. 5. In the modification of FIG. 14, the 1-H delay lines in the C type and Y type comb filters in the embodiment of FIG. 5 are replaced with a single 1-H delay line. More particularly, the output of band-pass filter 23 and the output of a 1-H delay line 46 delaying the output of the band-pass filter 23 are added to an adder 48 to cancel out the chrominance signal and obtain the luminance signal here. Also, the output of the band-pass filter 23 and phase inversion output of the 1-H delay line 46 are added to another adder 47 to cancel out the luminance signal and obtain the chrominance signal. It will be seen that this method requires only a single 1-H delay line.

In the modification of FIG. 15, the luminance signal from band-pass filter 37 is coupled to mixing amplifier 32, and the output of the mixing amplifier 32 is combined with the output of a delay line 49 delaying the chrominance signal output of C type comb filter 28.

Figure 16:
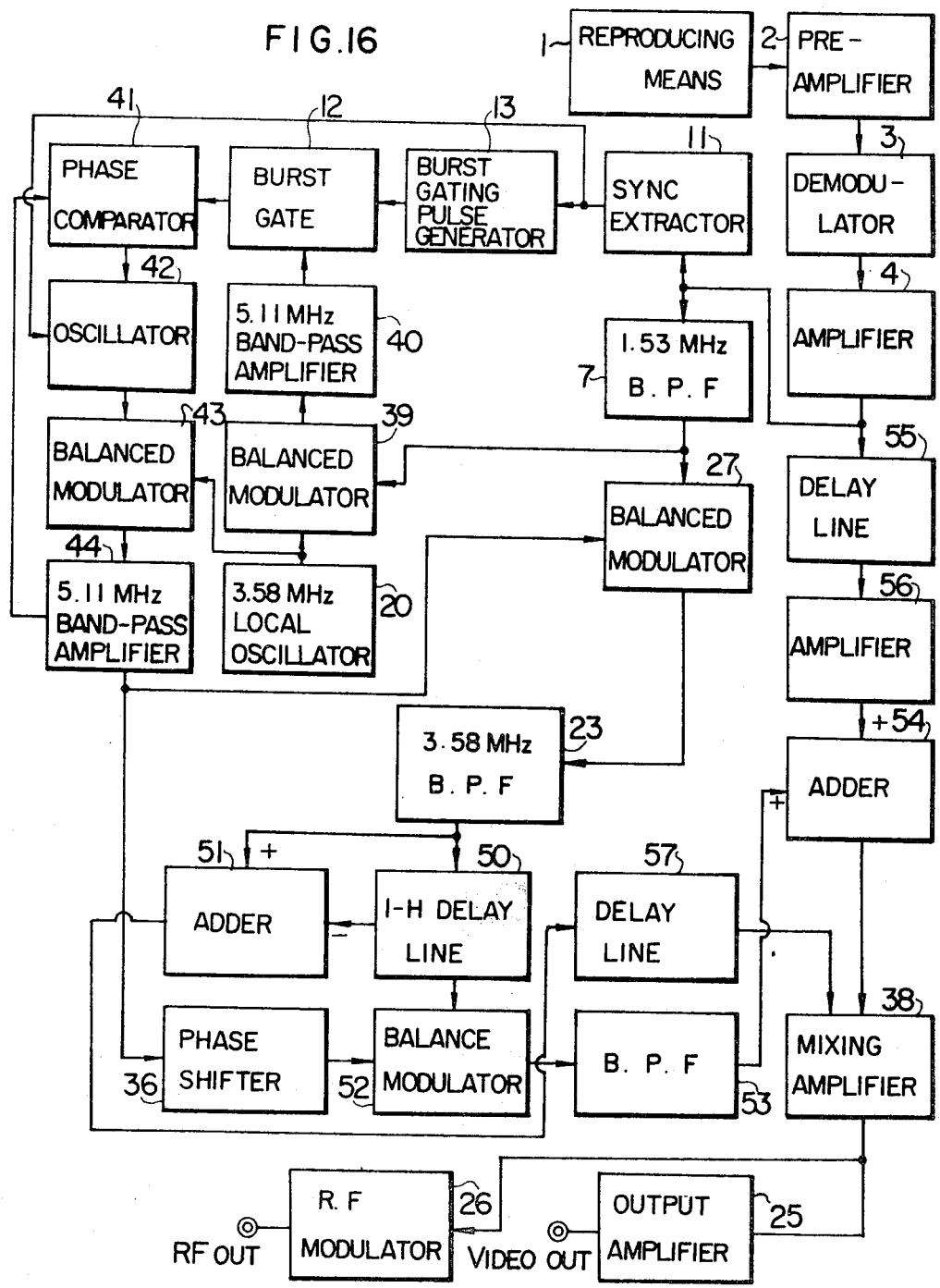

FIG. 16 shows a further embodiment of the invention. Here, the signal in the reproduced chrominance signal band (at 1.53 MHz ± 0.5 MHz) extracted from band-pass filter 7 is applied to balanced modulator 27 for balanced modulation with the output signal of band-pass amplifier 44 (at the frequency $f_s + f_{s1} \approx 5.11$ MHz), and the resultant difference combination of signals is extracted through band-pass filter 23 and added to a 1-H delay line 50. The output of the band-pass filter 23 is also coupled to an adder 51, where it is combined with the output of the 1-H delay line 50. The 1-H delay line 50 and adder 51 constitute a C type comb filter for removing the luminance signal component within the chrominance signal band from the output of the band-pass filter 23, thus obtaining only the chrominance signal. The chrominance signal output thus obtained from the adder 51 constitutes the NTSC system chrominance signal having the color subcarrier frequency of 3.58 MHz. Meanwhile, the other output of the 1-H delay line 50 is applied to a balanced modulator 52 for balanced modulation with the output of variable phase shifter 36, that is, the phase shifted output of the band-pass amplifier 44, and the resultant difference combination of signals is extracted through a band-pass filter 53. The output signal of the band-pass filter 53 has the frequency band of the chrominance signal in the original composite video signal and is delayed by one line. This signal is applied to an adder 54 and combined there with the signal also applied thereto from amplifier 4 through a delay line 55 and an amplifier 56. It will be appreciated here that by suitably selecting the delay time of the delay line 55 the delay time between both the inputs to the adder 54 may be made equal to 1-H, that is, it is possible to obtain the function of a Y type comb filter for removing the color signal in the frequency range of 1.53 ± 0.5 MHz colorplexed in a frequency interlaced relation with the luminance signal, whereby the sole luminance signal can be obtained from the adder 54. The output of the adder 54 and the output of a delay line 57 delaying the chrominance signal output of the adder 51 are combined in adder amplifier 38 to obtain the NTSC color television signal.

Figure 17:
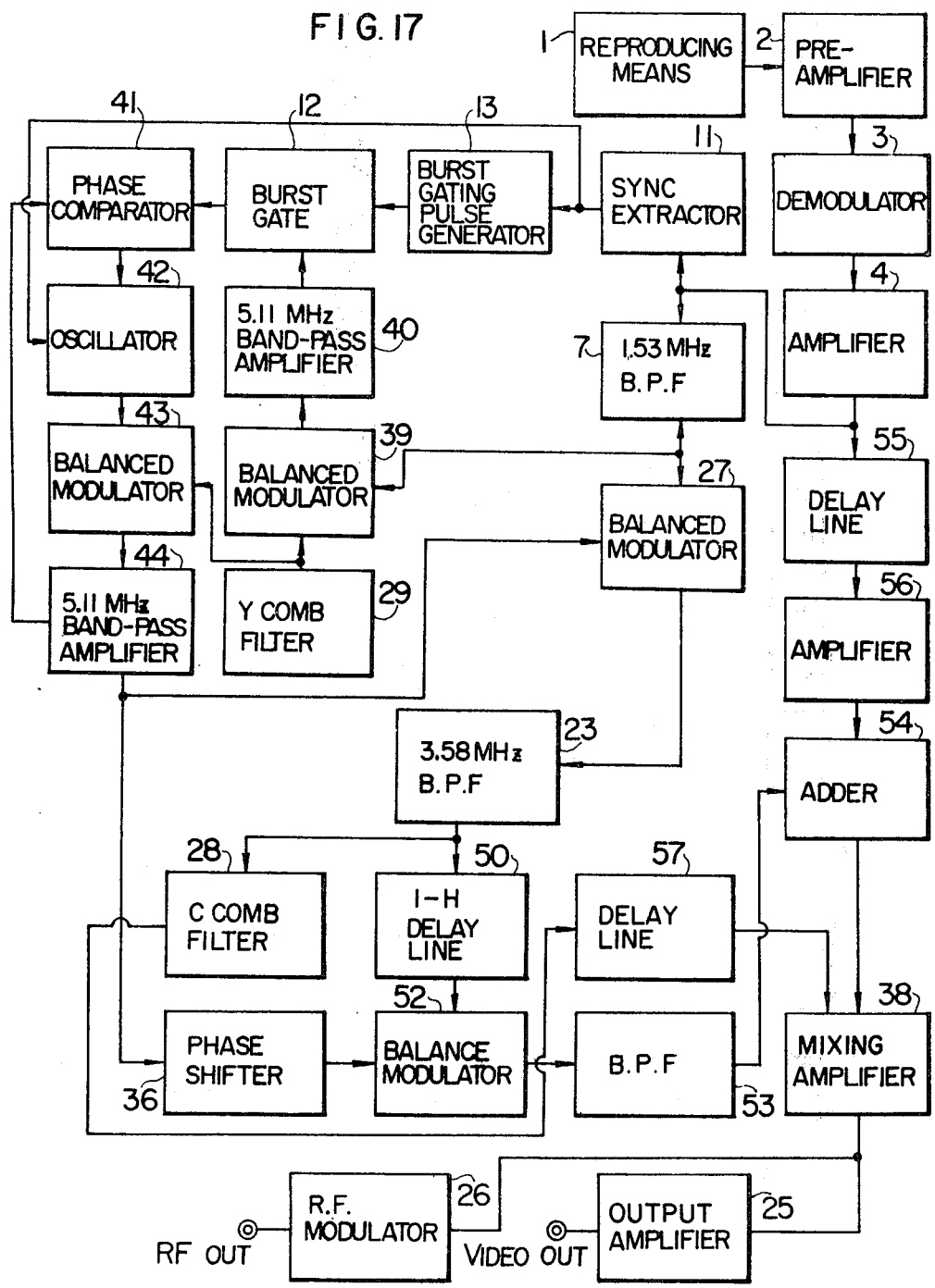

FIG. 17 shows a modification of the preceding embodiment of FIG. 16. This modification is different from the embodiment of FIG. 16 in that a C type comb filter 28 is provided independently from 1-H delay line 50. Though this construction requires two 1-H delay lines, it is advantageous where it is required to vary the characteristics of the individual comb filters.

Figure 18:
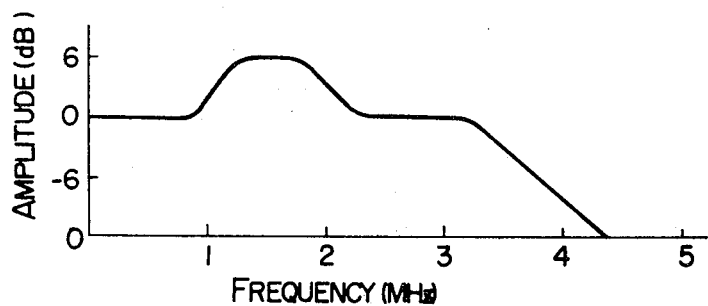
FIGS. 18 and 19 are graphs showing frequency characteristics of some component parts in the video signal processing system according to the invention.

In the preceding embodiments of FIGS. 16 and 17, the output signal of the band-pass filter 53 has a frequency band, which is processed or restricted by the frequency coverage of band-pass filter 7, balanced modulator 27, band-pass filter 23, 1-H delay line 50, balanced modulator 52 and band-pass filter 53 and is about 1.53 ± 0.5 MHz ($f_{s1}$ ± 0.5 MHz). Thus, when this signal is combined with the output of the amplifier 56 for cancelling out the chrominance signal, the resultant luminance signal is distorted, with its component over the afore-mentioned range of about 1.53 ± 0.5 MHz raised to nearly double the proper level as shown in FIG. 18, so that fidelity reproduction of signal cannot be obtained.

Figure 19:
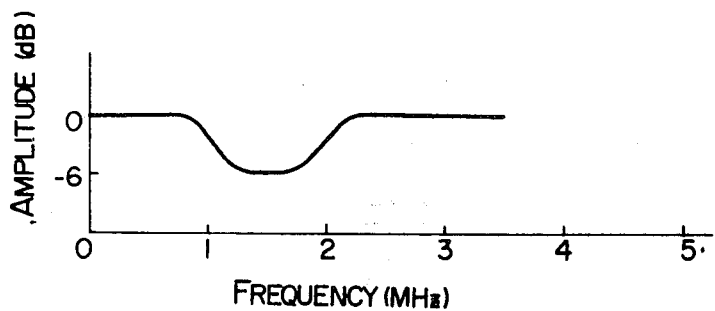

This distortion of the amplitude-frequency characteristic can be compensated for by constructing the amplifier 56 such that it has an amplitude-frequency characteristic as shown in FIG. 19 or adding a separate amplifier having the characteristic of FIG. 19. By so doing, fidelity reproduction of the composite video signal can be obtained.

Figure 20:
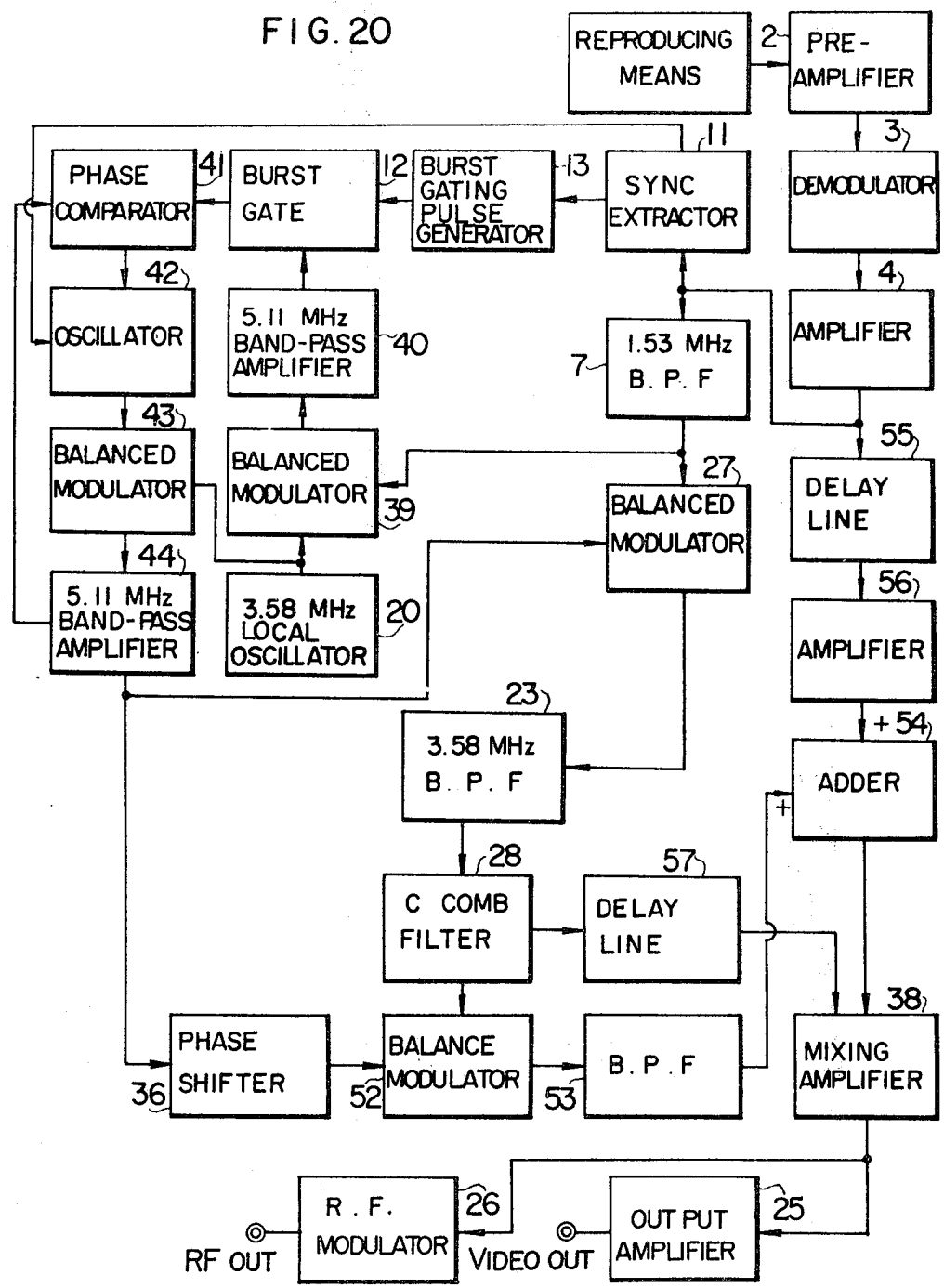

FIG. 20 shows a further embodiment, which is effective for improving the distortion of the amplitude-frequency characteristic mentioned in connection with the preceding embodiments of FIGS. 16 and 17. Again here, the signal in the reproduced chrominance signal band extracted from band-pass filter 7 is applied to balanced modulator 27 for balanced modulation with the output signal of band-pass amplifier 44, and the resultant difference combination of signals (at about 3.58 MHz ± 0.5 MHz) is extracted from band-pass filter 23. At this time, the color subcarrier frequency of the reproduced chrominance signal is replaced with the oscillation frequency of oscillator 20, that is, the color subcarrier frequency of the standard color television signal. In this embodiment, the output of the band-pass filter 23 is coupled to a C type comb filter 28, where the whole luminance signal included in the band is cancelled out to obtain the sole chrominance signal. The output of the C type comb filter 28 is applied to balanced modulator 52 for balanced modulation with the output of variable phase shifter (or delay line) 36, that is, the phase shifted or delayed output of band-pass amplifier 44, and the resultant difference combination of signals is extracted through band-pass filter 53 and applied to adder 54. Meanwhile, the output of video amplifier 4 is applied through delay line 55 and amplifier 56 to the adder 54. The delay time of the delay line 55 is set to coincide with the delay time of the chrominance signal produced in the circuits of 7, 27, 23, 28, 52 and 53, and it is also set such that the chrominance signal output of the band-pass filter 53 is 180° out of phase with the chrominance signal in the output of the amplifier 56. Thus, the chrominance signal in the reproduced composite video signal can be removed, and the output of the adder 54 consists of the sole luminance signal. The luminance signal thus obtained and the output of delay line 57 compensating the chrominance signal output of the C type comb filter 28 for the delay with respect to the luminance signal are combined in mixing amplifier 38 to obtain the NTSC color television signal.

With the above construction, through the balanced modulation of the signal in the reproduced chrominance signal band with the output signal of the band-pass amplifier 44 in the balanced modulator 27 the color subcarrier frequency of the reproduced chrominance signal inclusive of a frequency variation component can be completely cancelled out and replaced with the oscillation frequency of the oscillator 20. Also, by the balanced modulation of the chrominance signal obtained from the C type comb filter 28 with the signal coupled from band-pass amplifier 44 through variable phase shifter 36 to balanced modulator 52 and by converting the signal to a reproduced signal in the band of reproduced chrominance signal, the sole chrominance signal in the reproduced chrominance signal band is obtained. Since the comb filter is used, the chrominance signal thus obtained is the sum combination of signals in two adjacent lines. Since the correlation between signals in adjacent lines is very high, the correlation between the chrominance signal thus obtained and the chrominance signal component of the output of the amplifier 56 is also high, and both the signals can be regarded to be substantially identical. Thus, by combining the output of the band-pass filter 53 and the output of the amplifier 56 in opposite phase relation to each other, the chrominance signal in the reproduced composite video signal can be cancelled out. At this time, the variable phase shifter is effective for realizing the opposite phase relation of both the signals to be combined. In this way, the luminance signal can be separated steadily irrespective of frequency deviations introduced into the reproduced composite video due to such case as fluctuation of the speed of rotation of the disc.

What we claim is:

1. A video signal processing system comprising:
   a. means for reproducing an angular modulation signal recorded on a recording medium, said angular modulation signal being produced through angular modulation of a color television signal obtained by colorplexing a frequency shifted chrominance signal shifted to a lower frequency band with a luminance signal by using frequency interlacement;
   b. a demodulating means for demodulating said reproduced angular modulation signal;
   c. an extracting means for extracting a signal in the lower frequency shifted chrominance signal band from the demodulated signal and providing the extracted signal at its output;
   d. a first frequency conversion means having an output terminal for frequency converting the extracted signal in the lower frequency shifted chrominance signal band into a first signal in the chrominance signal band of standard color television signal;
   e. a first separating means connected to the output terminal of said first frequency conversion means for separating the chrominance signal from said first signal, said first separating means including a first comb filter including a one-line delay element and providing the separated chrominance signal at its output;
   f. a signal removing means, connected to an output terminal of said demodulating means, for removing the signal in the lower frequency shifted chrominance signal band from the demodulated color television signal and providing at its output the demodulated signal having the lower frequency shifted chrominance signal band removed;
   g. a second separating means, connected to the output terminal of said first frequency conversion means, for separating the luminance signal from said first signal, said second separating means including a second comb filter including a one-line delay element and providing at its output the separated luminance signal;
   h. a second frequency conversion means for frequency converting the luminance signal separated by said second separating means into a second signal in the frequency band of said lower frequency shifted chrominance signal band; and
   i. adding means for adding the output of said first separating means and the output of said second frequency conversion means to the output of said signal removing means; wherein a standard color television signal is obtained as the output of said adding means.

2. A video signal processing system according to claim 1, wherein said one-line delay elements of said first and second comb filters comprise a common delay element for said first and second comb filters.

3. A video signal processing system according to claim 1, wherein said adding means includes a first adding means for adding the output of said second frequency conversion means to the output of said signal removing means, and a second adding means for adding the output of said first separating means to the output of said first adding means.

4. The video signal processing system according to claim 1, wherein said first frequency conversion means comprises:
- a fixed oscillator producing a steady frequency signal at a frequency equal to the color subcarrier frequency of the standard color television signal;
- a third frequency conversion means for frequency converting the demodulated signal into a higher frequency signal through balanced modulation of the demodulated signal with the frequency signal of said fixed oscillator;
- means for extracting a color burst signal from the output of said third frequency conversion means;
- a variable oscillator oscillating at a controlled oscillation frequency;
- a fourth frequency conversion means for converting the output of said variable oscillator into a higher frequency signal through balanced modulation of said variable oscillator output with the frequency signal of said fixed oscillator;
- means for phase comparing the outputs of said fourth frequency conversion means and said color burst signal extracting means to produce an electric signal corresponding to the phase difference between said two compared outputs;
- means for applying said electric signal as a control signal to said variable oscillator; and
- a balanced modulator receiving as inputs the output of said fourth frequency conversion means and the extracted signal of said means for extracting a signal in the lower frequency shifted chrominance band.

5. The video signal processing system according to claim 4, further comprising means for frequency multiplying the output of said variable oscillator and applying the frequency multiplied output to said fourth frequency conversion means for balanced modulation with the frequency signal of said fixed oscillator.

6. A video signal processing system according to claim 1, wherein said system further comprises a third separating means for separating a color burst signal from said demodulated angular modulation signal and providing at its output the burst signal, means for producing a continuous signal synchronized in phase with the separated burst signal, and means for producing a signal associated with the continuous signal and applying said associated signal to said first frequency conversion means wherein by means of said associated signal the extracted signal in said lower frequency shifted chrominance signal band is frequency converted to said first signal.

7. The video signal processing system according to claim 6, wherein said continuous signal producing means comprises:
- a fixed oscillator producing a steady frequency signal at a frequency equal to the color subcarrier frequency of the standard color television signal;
- a third frequency conversion means for producing a burst signal at a higher frequency than said color burst signal through balanced modulation of said color burst signal with the frequency signal of said fixed oscillator;
- a variable oscillator oscillating at a controlled oscillation frequency;
- a fourth frequency conversion means for converting the frequency of the output of said variable oscillator to a higher frequency through balanced modulation of said variable oscillator output with the frequency signal of said fixed oscillator;
- a means for phase comparing the outputs of said third and fourth frequency conversion means to produce an electric signal corresponding to the phase difference between said two compared outputs; and
- means for applying said electric signal as a control signal to said variable oscillator;
- said continuous signal being obtained as the output of said fourth frequency conversion means.

8. The video signal processing system according to claim 7, further comprising means for frequency multiplying the output of said variable oscillator and applying the frequency multiplied output to said fourth frequency conversion means for balanced modulation with the frequency signal of said fixed oscillator.

9. A video signal processing system comprising:
a. means for reproducing an angular modulation signal recorded on a recording medium, said angular modulation signal being produced through angular modulation of a color television signal obtained by colorplexing a frequency shifted chrominance signal shifted to a lower frequency band with a luminance signal by using frequency interlacement;
b. a demodulating means for demodulating said reproduced angular modulation signal;
c. an extracting means for extracting a signal in the lower frequency shifted chrominance signal band from the demodulated signal and providing the extracted signal at its output;
d. a first frequency conversion means having an output terminal for frequency converting the extracted signal in the lower frequency shifted chrominance signal band into a first signal in the chrominance signal band of a standard color television signal;
e. a separating means connected to the output terminal of said first frequency conversion means for separating the chrominance signal from said first signal, said first separating means including a first comb filter and providing the separated chrominance signal at its output;
f. a delay means connected to the output terminal of said first frequency conversion means, for delaying said first signal by one scan line;
g. a second frequency conversion means for frequency converting the output of said delay means to the frequency band of said lower frequency shifted chrominance signal band;
h. an adding means for adding the output of said second frequency conversion means to said demodulated angular modulation signal in opposite phase to each other so that only the lower frequency shifted chrominance signal in said demodulated angular modulation signal is cancelled by the chrominance signal in the output of said second frequency conversion means; and
i. a mixing means for mixing the output of said separating means with the output of said adding means wherein a standard color television signal is obtained as the output of said mixing means.

10. A video signal processing system according to claim 9, wherein said delay means and said comb filter comprise a common one-line delay element.

11. A video signal processing system according to claim 9, wherein said demodulated angular modulation signal is applied to said adding means through an electric circuit having an attenuation characteristic over said lower frequency shifted chrominance signal band.

12. A video signal processing system according to claim 9, wherein said system further comprises a second separating means for separating a color burst signal from said demodulated angular modulation signal and providing at its output the burst signal, means for producing a continuous signal synchronized in phase with the separated burst signal, and means for producing a signal associated with the continuous signal and applying said associated signal to said first frequency conversion means wherein by means of said associated signal the extracted signal in said lower frequency shifted chrominance signal band is frequency converted to said first signal.

13. A video signal processing system according to claim 12 further comprising means for applying the signal associated with said continuous signal to said second frequency conversion means, and wherein by means of the associated signal the output of said delay means is frequency converted to the frequency band of said lower frequency shifted chrominance signal band.

14. A video processing system comprising:
 a. means for reproducing an angular modulation signal recorded on a recording medium, said angular modulation signal being produced through angular modulation of a color television signal obtained by colorplexing a frequency shifted chrominance signal shifted to a lower frequency band with a luminance signal by using frequency interlacement;
 b. a demodulating means for demodulating said reproduced angular modulation signal;
 c. an extracting means for extracting a signal in the lower frequency shifted chrominance signal band from the demodulated signal and providing the extracted signal at its output;
 d. a first frequency conversion means having an output terminal for frequency converting the extracted signal in the lower frequency shifted chrominance signal band into a first signal in the chrominance signal band of a standard color television signal;
 e. a first separating means connected to the output terminal of said first frequency conversion means for separating the chrominance signal from said first signal, said first separating means including a first comb filter including a one-line delay element and providing the separated chrominance signal at its output;
 f. a second frequency conversion means for frequency converting the chrominance signal separated by said first separating means to the frequency band of said lower frequency shifted chrominance signal band;
 g. an adding means for adding the output of said second frequency conversion means to said demodulated angular modulation signal in opposite phase to each other so that only the lower frequency shifted chrominance signal in said demodulated angular modulation signal in cancelled; and
 h. means for mixing the output of said first separating means with the output of said adding means wherein a standard color television signal is obtained as the output of said mixing means.

15. A video signal processing system according to claim 14, wherein said further comprises a second separating means for separating a color burst signal from said demodulated angular modulation signal and providing at its output the burst signal, means for producing a continuous signal synchronized in phase with the separated burst signal, and means for producing a signal associated with the continuous signal and applying said associated signal to said first frequency conversion means wherein by means of said associated signal the extracted signal in said lower frequency shifted chrominance signal band is frequency converted to said first signal.

16. A video signal processing system according to claim 15, further comprising means for applying the signal associated with said continuous signal to said second frequency conversion means, and wherein by means of the associated signal the output of said first separating means is frequency converted to the frequency band of said lower frequency shifted chrominance signal band.

* * * * *

Notice of Adverse Decision in Interference

In Interference No. 100,046, involving Patent No. 3,961,359, N. Okuno, T. Kamogawa, and K. Kamisaka, VIDEO SIGNAL PROCESSING SYSTEM FOR REPRODUCING A VIDEO SIGNAL FROM A BANDWIDTH LIMITED RECORDED SIGNAL, final judgment adverse to the patentees was rendered Apr. 27, 1979, as to claim 14.

[*Official Gazette September 4, 1979.*]